(12) United States Patent
Strayer et al.

(10) Patent No.: US 6,700,389 B2
(45) Date of Patent: Mar. 2, 2004

(54) TEMPERATURE COMPENSATION OF AN INDUCTIVE SENSOR

(75) Inventors: Lance Ronald Strayer, Clarkston, MI (US); Michael D. Lutton, Grand Blanc, MI (US); Chris C. Begley, Ortonville, MI (US)

(73) Assignee: Delphi Technologies, Inc., Troy, MI (US)

( * ) Notice: Subject to any disclaimer, the term of this patent is extended or adjusted under 35 U.S.C. 154(b) by 18 days.

(21) Appl. No.: 09/932,296

(22) Filed: Aug. 17, 2001

(65) Prior Publication Data

US 2003/0052696 A1 Mar. 20, 2003

(51) Int. Cl.[7] ............................................... G01R 31/06
(52) U.S. Cl. .................................................... 324/546
(58) Field of Search .............................. 73/290 R, 291, 73/295, 304 R, 308; 340/584, 612, 618, 622; 336/179; 324/202, 204, 207.16, 224, 225, 605, 654, 656, 716, 720, 721, 546

(56) References Cited

U.S. PATENT DOCUMENTS

| | | | | |
|---|---|---|---|---|
| 3,772,915 A | * | 11/1973 | Stamler | 73/194 M |
| 4,091,671 A | | 5/1978 | McLees | |
| 4,095,468 A | * | 6/1978 | Sidor | 73/362 R |
| 4,690,147 A | * | 9/1987 | Ooe et al. | 128/635 |
| 4,796,212 A | * | 1/1989 | Kitagawa | 364/571.03 |
| 5,115,193 A | * | 5/1992 | Bean et al. | 324/207.12 |
| 5,138,559 A | * | 8/1992 | Kuehl et al. | 364/509 |
| 5,150,615 A | | 9/1992 | Rymut et al. | |
| 5,157,452 A | * | 10/1992 | Suzuki et al. | 356/128 |
| 5,332,966 A | * | 7/1994 | Berberich | 324/207.12 |
| 5,602,333 A | | 2/1997 | Larrabee et al. | |
| 5,686,658 A | * | 11/1997 | Boren | 73/49.2 |
| 5,837,884 A | * | 11/1998 | Kimura et al. | 73/25.4 |
| 6,018,247 A | * | 1/2000 | Kelly | 324/644 |
| 6,163,087 A | * | 12/2000 | Huang et al. | 307/64 |

* cited by examiner

*Primary Examiner*—Uyen Le
*Assistant Examiner*—Etienne P LeRoux
(74) *Attorney, Agent, or Firm*—Jimmy L. Funke

(57) ABSTRACT

This invention discloses an apparatus and method of determining the temperature of the core of an inductive coil sensor so that the effective inductance of the coil sensor can be temperature compensated to thereby provide an accurate measure of the level of fuel in a tank. The method comprises energizing the sensor with a prescribed voltage, de-energizing the sensor, measuring the resultant voltage across the sensor, and determining the core temperature from the measured resultant voltage across the sensor.

3 Claims, 6 Drawing Sheets

TEMPERATURE COMPENSATION OF AN INDUCTIVE SENSOR

TECHNICAL FIELD

This invention relates to inductive coil sensors and more particularly to temperature compensation of such sensors.

BACKGROUND

Inductive coils have been used to determine liquid levels by measuring the change in the effective inductance of a coil sensor obtained as a magnetic core moves within a current carrying coil. The further the core is inserted into the coil, the greater the effective inductance and vice versa. By measuring this effective inductance, the relative position of the core inside of the coil can be determined. The core is connected by way of a lever arm to a floatation device residing in the liquid. As the level of the liquid increases, the core is inserted further into the coil thus, increasing the effective inductance of the coil and as the level decreases, the core is retracted from the coil thus decreasing the effective inductance.

The effective inductance of the coil is determined by the number of turns in the coil, the current carried by the coil, the geometry of the coil, and the position of the core within the coil. The effective inductance is also affected by the magnetic permeability of the core. The number of turns, the current, and the geometry of the coil are all fixed parameters in the design of the coil sensor. The position of the core depends upon the liquid level, however, the magnetic permeability of the core is temperature dependent. Thus, the effective inductance will vary not only with fuel level but also with the temperature of the core. The temperature-dependence of the core's magnetic permeability has more effect the farther the core is inserted into the coil. In order to make an accurate automotive fuel level sensor, the temperature of the core needs to be determined so that the effective inductance can be temperature compensated.

One method for determining the temperature of the core is to add a temperature-sensitive device in close proximity to the core. Such devices include, but are not limited to, thermistors, RTD's and thermocouples. However, adding such devices increases the cost and reduces the reliability of the inductive fuel level sensor.

SUMMARY OF THE INVENTION

This invention discloses a method of determining the temperature of the core of an inductive coil sensor so that the effective inductance of the coil sensor can be temperature compensated to thereby provide an accurate measure of the level of fuel in a tank. It is impractical to directly measure the temperature of the core of the coil sensor since the core moves. However, since the temperature in a fuel tank varies relatively slowly, it is possible to measure a nearby temperature and assign that temperature to the core.

The temperature of the core, $T_{core}$, is determined by the temperature of the sensor coil, $T_{coil}$, since the coil is in close proximity to the core. $T_{coil}$ can be determined from the resistance of the coil, $R_{coil}$. Thus a method of compensating for the temperature dependence of the core of a coil sensor is disclosed. The method comprises energizing the sensor with a prescribed voltage; after a prescribed time interval, measuring the resultant voltage across the sensor; and determining the core temperature from the measured resultant voltage across the sensor.

Once the temperature of the core is known, the effective inductance of the coil can be compensated for temperature changes. The inductive coil sensor is connected to a Fuel Control Unit. The Fuel Control Unit contains the electronics to measure the effective inductance of the coil and to read the coil resistance. The Fuel Control Unit uses the coil resistance to compensate the effective inductance of the coil and to provide an accurate measure of fuel level.

DETAILED DESCRIPTION OF THE INVENTION

An inductive coil is constructed by winding a given number of turns of conductive wire onto a bobbin. Copper is used as the wire material due to its low cost and low electrical resistance. Although the resistance of the coil, $R_{coil}$, is small, it is easily measurable.

Copper has a very well defined change in resistance due to temperature. The temperature coefficient of resistance, $\alpha$, for Copper as given by *The Engineers' Manual* by Hudson is 0.00393 per degree C. at 20 degrees C. By analyzing the change in resistance in the copper coil, $R_{coil}$, the temperature change of the coil, $T_{coil}$, can be determined.

Figure 1:
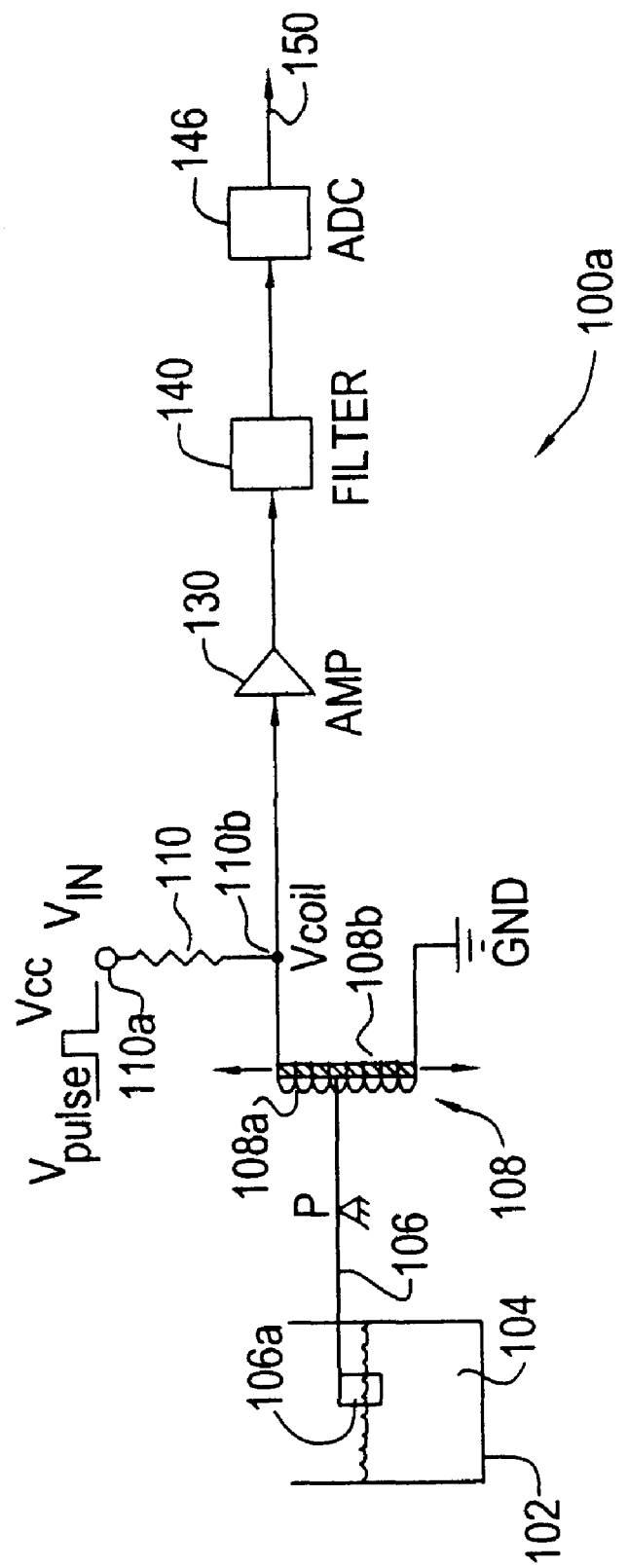
FIG. 1 is a generalized schematic diagram of an electromechanical system including an electric circuit having a coil sensor for determining the level of a liquid in a container.

Referring now to FIG. 1, an electromechanical system is shown generally at 100. The electromechanical system 100 comprises a circuit 100a for an inductive coil sensor 108. The circuit 100a comprises a core 108a mechanically linked by way of a lever arm 106 to a floatation device 106a resting in a liquid 104 within a container 102. The core 108a is moveable within an inductive coil 108b. As the flotation device 106a rises and falls with the level of the liquid 104, the core 108a falls and rises as the lever arm 106 pivots about point P. The movement of the core 108a within the coil 108*b* causes the effective inductance of the coil 108*b* to change in a measurable way. An input terminus 110*a* of input resistor 110 is energized by a square wave signal, $V_{pulse}$, having values of 0 volts and $V_{cc}$ volts as seen for example at 202 in FIG. 4. Such a voltage input at 110*a* results in a corresponding coil voltage, $V_{coil}$, at an output terminus 110*b* of the input resistor 110. $V_{coil}$ is amplified by an amplifier 130 which provides as output a signal, $V_{out}$, which is filtered at 140. The output of the filter is provided as input to an analog-to-digital converter (ADC) 146.

Figure 2:
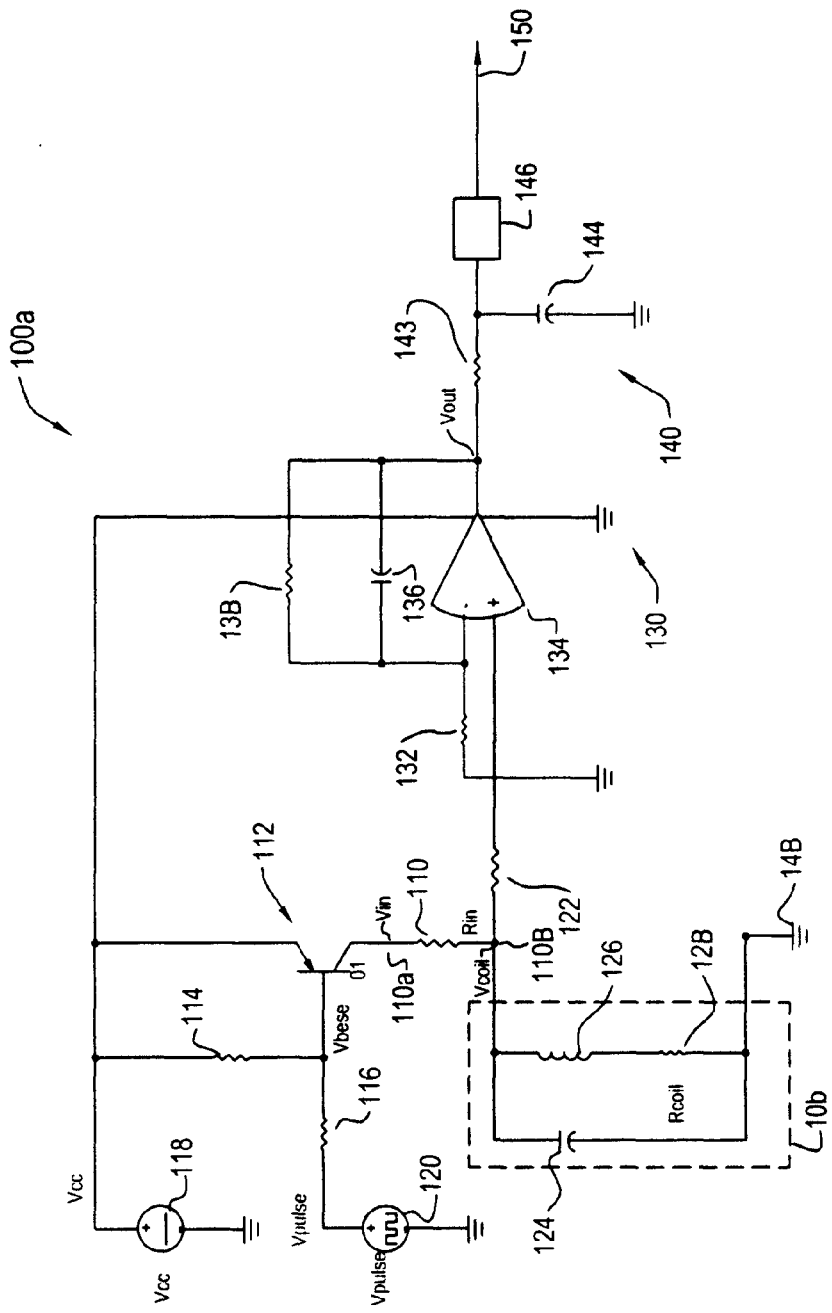
FIG. 2 is a schematic diagram of an exemplary embodiment of the electric circuit of FIG. 1 including a model of a coil sensor for determining the temperature of a liquid in a container.

Referring to FIG. 2, an exemplary embodiment of the circuit 100*a* of FIG. 1 is shown. In FIG. 2, $V_{pulse}$ is provided by an oscillator 120 connected to the base of a pnp bipolar junction transistor 112 ($Q_1$) having a supply voltage, $V_{cc}$, of 5 volts provided by a power source 118. $Q_1$ 112 is used to switch $V_{cc}$ to the coil sensor for about 100 msec through $R_{in}$. The coil sensor 108 of FIG. 1 can be modeled as a parallel RLC circuit 124, 126, 128. In the circuit shown in FIG. 2, $R_{in}$ is chosen to be much larger than $R_{coil}$. This allows the resistance of the coil to be neglected in determining the effective inductance of the coil to determine fuel level.

A method of measuring $R_{coil}$ is to measure the voltage across the coil, $V_{coil}$. In order to measure $V_{coil}$, a square wave used to measure the effective inductance is halted temporarily and $Q_1$ in FIG. 2 would remain turned "on" until the coil is fully charged. To measure temperature, the square wave on $V_{pulse}$ is stopped and $V_{pulse}$ is set to 0 Volts to turn $Q_1$ on. Once the coil is fully charged, the voltage across the coil is given by $$V_{coil} = \frac{R_{coil}}{R_{coil} + R_{in}} \times V_{in}. \quad (1)$$

as shown in FIG. 2. If $R_{in}$ and $V_{cc}$ do not vary with temperature, then $R_{coil}$ would be the only temperature dependent variable. To accomplish this, $R_{in}$ is chosen to be a discrete resistor with a low temperature coefficient as is common with carbon resistors. The voltage difference between $V_{cc}$ and $V_{in}$ is negligible for low currents flowing through $Q_1$. Thus, $V_{in} \approx V_{cc}$, and $$V_{coil} \approx \frac{R_{coil}}{R_{coil} + R_{in}} \times V_{cc}. \quad (1a)$$

$V_{cc}$ can vary somewhat with temperature but this can be neglected if the ADC is also powered by $V_{cc}$. Therefore, the coil voltage can be approximated to vary in the same fashion as the temperature coefficient of resistance of copper (0.393% per degree C.).

Figure 3:
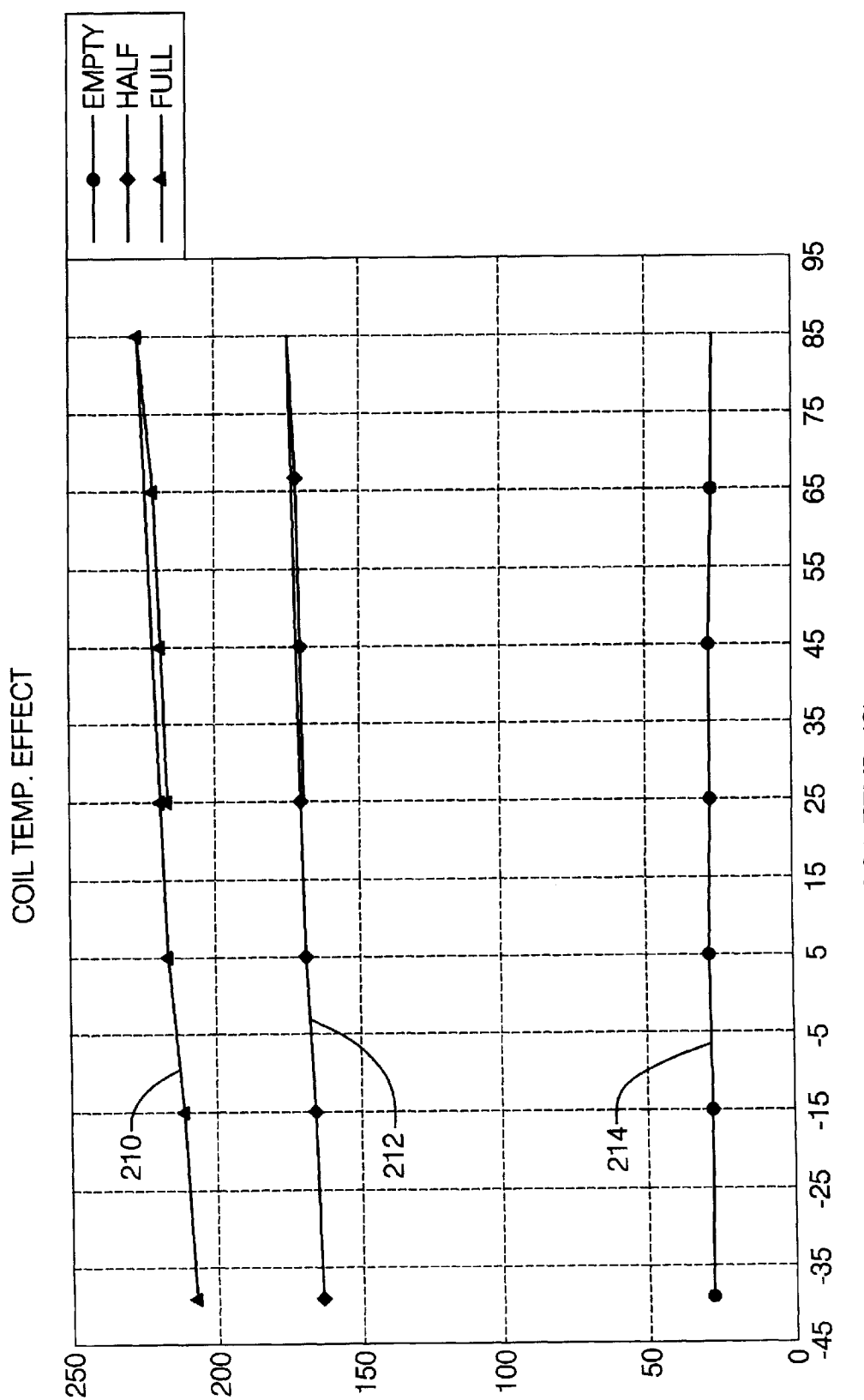
FIG. 3 is a graphical representation of experimental data depicting the effect of the temperature dependence of the magnetic permeability of the core of an inductive coil sensor on the temperature of the core, wherein a first graph shows the temperature dependence of the magnetic permeability of the core with the core substantially out of the coil, a second graph shows the temperature dependence of the magnetic permeability of the core with the core approximately half way within the coil and a third graph shows the temperature dependence of the magnetic permeability of the core with the core substantially fully within the coil.

FIG. 3 displays experimental data at 210, 212 and 214 that shows the effect of the temperature-dependence of the core's magnetic permeability with the distance that the core is within the sensor coil. It shows the effective inductance at the full position 210 varying by 4% from −40 degrees C. to 85 degrees C.

Figure 4:
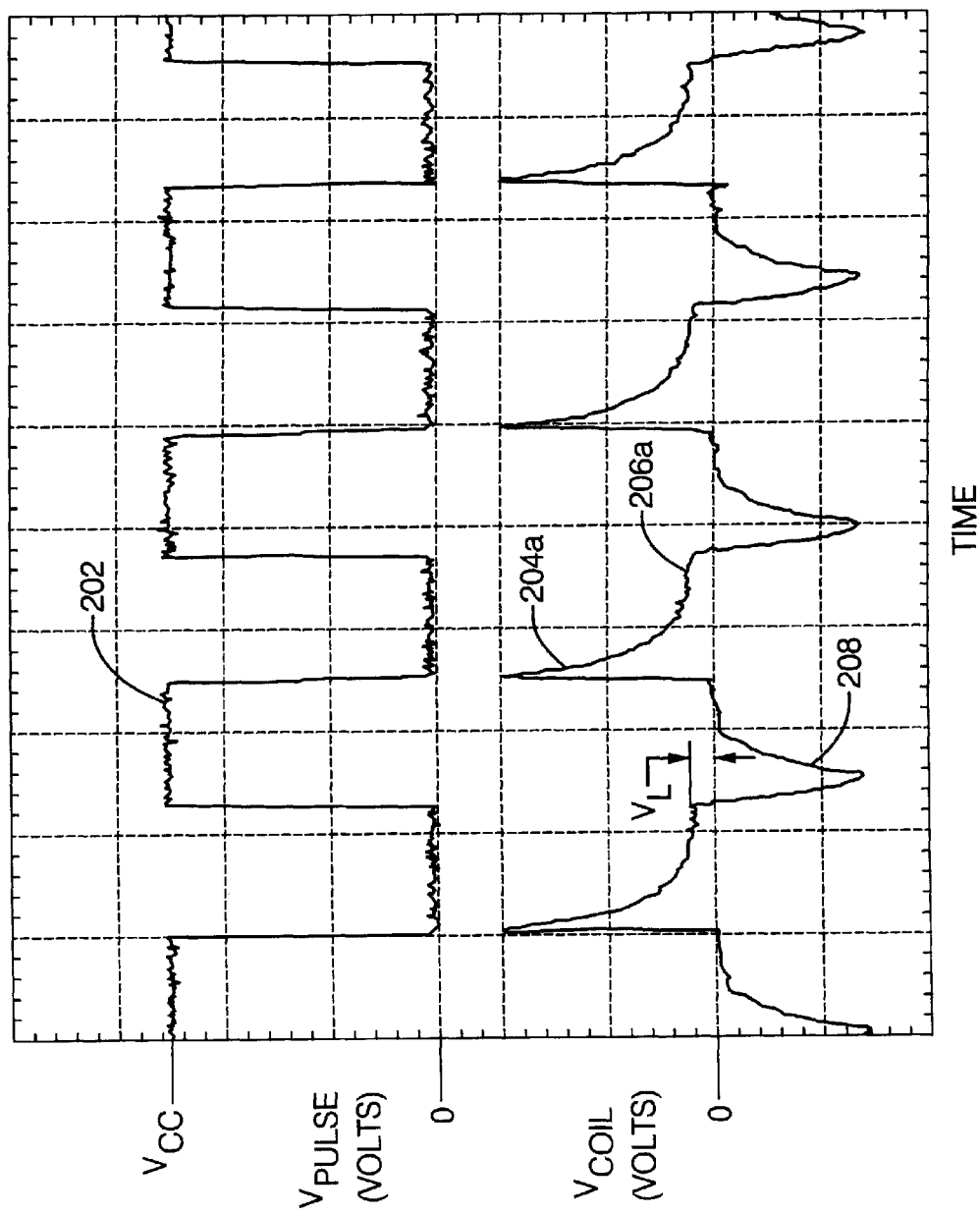
FIG. 4 is a graphical representation depicting the relative timing of the square wave driving pulse voltage, $V_{pulse}$, of FIG. 1 and the resultant voltage, $V_{coil}$ across the coil sensor.
Figure 5:
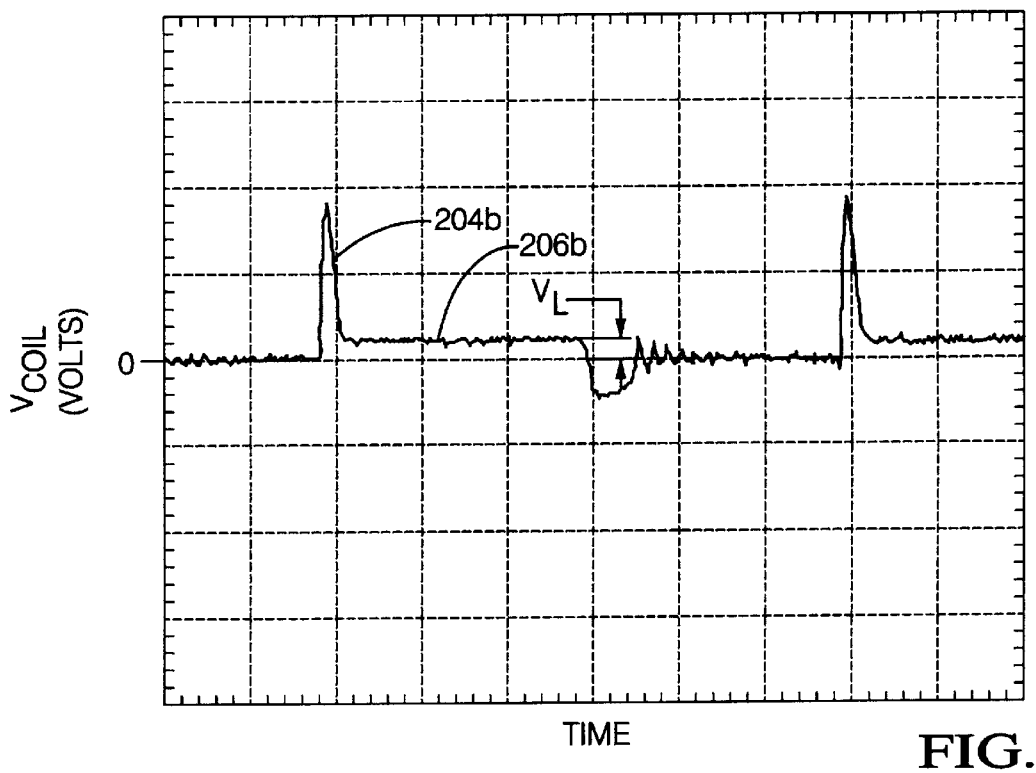
FIG. 5 is a graphical representation of the exponential decay of $V_{coil}$ wherein the core of the coil sensor is not inserted into the coil.
Figure 6:
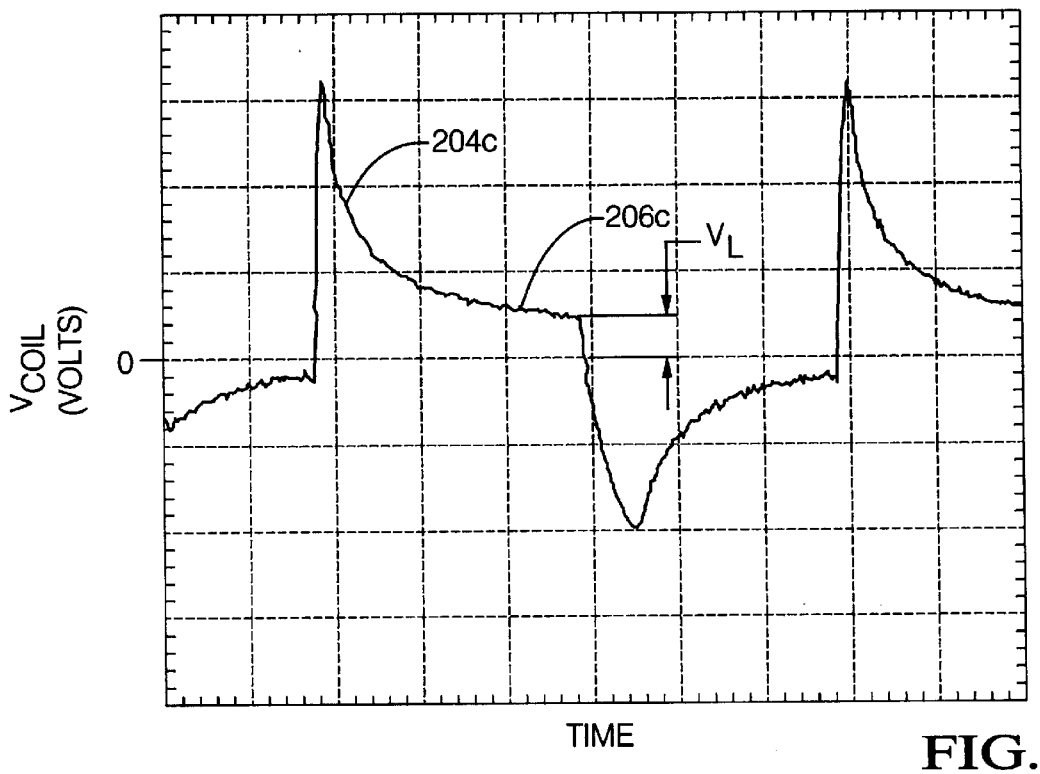
FIG. 6 is a graphical representation of the exponential decay of $V_{coil}$ wherein the core of the coil sensor is fully inserted into the coil.

As seen in FIGS. 2 and 4, $V_{in}$ is alternately energized and de-energized at 110*a* by a square wave pulse, $V_{pulse}$, 202 having values of zero volts and $V_{cc}$ volts. When $V_{pulse}$ is positive ($Q_1$ off), $V_{coil}$ grows exponentially as seen at 208 in FIG. 4. When $V_{pulse}$ is zero ($Q_1$ on), the inductor 126 is charging and $V_{coil}$ decays exponentially as seen at 204*a*. Depending upon the time constant, $\tau_L$, of the coil sensor 108, as seen at 206*a*, $V_{coil}$ will decay to a substantially constant value $V_L$ after a prescribed time interval, $t_0$. It will be appreciated from FIGS. 5 and 6 that as the core 108*a* moves into and out of the coil 108*b*, the time constant, $\tau_L$, of the coil sensor 108 changes and the rate of the exponential decay 204*b*, 204*c* will change. Thus, FIG. 5 is representative of the sensor 108 charging when the core 108*a* is substantially out of the coil 108*b* and FIG. 5B is representative of the sensor 108 charging when the core 108*a* is more fully encompassed by the coil 108*b*. $Q_1$ is left turned on for a sufficiently long time interval, $t_1 > t_0$ (e.g., 100 msec) until $V_{coil}$ settles to the substantially DC voltage level of $V_L$ at 206*b* and 206*c*. At such time, in the circuit model 108 of FIG. 2, inductor 126 acts as a short circuit and capacitor 124 acts an open circuit. Thus, at $t_1$ a voltage divider is created between $V_{in}$ at 110*a*, $V_{coil}$ at 110*b* and electrical ground at 148. Thus, $$V_L(T_{coil}) = \frac{R_{coil}(T_{coil})}{R_{coil}(T_{coil}) + R_{in}} \times V_{cc}. \quad (2)$$

In the circuit of FIG. 2, $V_L$ is about 120 mV if $R_{coil}$ is about 25 Ohms. If $V_L$ has been measured at a reference temperature $T_0$, then $$V_L(T_0) = \frac{R_{coil}(T_0)}{R_{coil}(T_0) + R_{in}} \times V_{cc}. \quad (3)$$

$R_{coil}$ varies with temperature $T_{coil}$ according to the equation:

$$R_{coil}(T_{coil}) = R_{coil}(T_0)[1 + \alpha(T_{coil} - T_0)], \quad (4)$$

where $\alpha$ is the temperature coefficient of resistance. Equations (2) and (3) can be substituted into equation (4) to give the difference between $T_{coil}$ and $T_0$:

$$T_{coil} - T_0 = \frac{1}{\alpha}\left[\left(\frac{V_L(T_{coil})}{V_L(T_0)}\right)\left(\frac{V_{cc} - V_L(T_0)}{V_{cc} - V_L(T_{coil})}\right) - 1\right]. \quad (5)$$

It will be appreciated that in Eq. 5, $V_{in}$ may be substituted for $V_{cc}$.

To measure $T_{coil}$, the oscillator 120 is stopped periodically (e.g., once every second) in the low state. Approximately 100 msec are allowed to pass whereupon $V_{coil} \rightarrow V_L$, from which is found $V_L(T_{coil})$. $T_0$, $V_L(T_0)$, $V_{cc}$ and $\alpha$ are known and $T_{coil}$ can be determined from Eq. 5. Due to the proximity of the core 108*a* and the coil 108*b* to one another within the coil sensor 108, $T_{core} = T_{coil}$.

Once the temperature of the coil is known, then the temperature compensated effective inductance of the sensor at $T_0$, $V_{sensor}(T_0)$, can be calculated from the uncompensated effective inductance of the sensor at $T_{coil}$, $V_{sensor}(T_{coil})$, according to:

$$V_{sensor}(T_0) = \frac{V_{sensor}(T_{coil}) - (V_{empty} + \beta_{empty}(T_{coil} - T_0))}{(V_{full} + \beta_{full}(T_{coil} - T_0)) - (V_{empty} + \beta_{empty}(T_{coil} - T_0))} \times V_{cc} \quad (6)$$

where $\beta_{empty}$ is the temperature dependence of $V_{empty}$ and $\beta_{full}$ is the temperature dependence of $V_{full}$. If $V_{empty}$ is measured with the core outside of the coil, then $V_{empty}$ will not be affected by temperature and then $\beta_{empty} = 0$. If we let $\beta_{full} = \beta$, then Eq. 6 simplifies to:

$$V_{sensor}(T_0) = \frac{V_{sensor}(T_{coil}) - V_{empty}}{V_{full} - V_{empty} + \beta(T_{coil} - T_0)} \times V_{cc} \quad (6a)$$

where $V_{empty}$ is $V_{sensor}(T_0)$ at the empty position and at temperature $T_0$, $V_{full}$ is $V_{sensor}(T_0)$ when the core is substantially fully inserted into the coil at temperature $T_0$, and $\beta$ is the temperature dependence of the core's magnetic permeability. $V_{sensor}$ is the output voltage, $V_{op}$, of the integrating Opamp 130 of FIG. 7. It will be appreciated that in Eqs. 6 and 6a, $V_{in}$ may be substituted for $V_{cc}$.

It will be appreciated that since $R_{in} \gg R_{coil}$, Eqs. 2 and 3 can be simplified:

$$V_L(T_{coil}) \approx \frac{R_{coil}(T_{coil})}{R_{in}} \times V_{cc} \text{ and} \quad (2a)$$

$$V_L(T_0) \approx \frac{R_{coil}(T_0)}{R_{in}} \times V_{cc} \quad (3a)$$

This leads to a simplification of Eq. 5; namely:

$$T_{coil} - T_0 \approx \frac{1}{\alpha}\left[\frac{V_L(T_{coil})}{V_L(T_0)} - 1\right] \quad (5a)$$

Equation 5a is a useful approximation for implementation on a microprocessor.

In FIG. 2, the amplifier 130 of FIG. 1 comprises an operational amplifier 134 having resistors 132 and 138 and capacitor 136 in a negative feedback circuit. The operational amplifier 134 accepts as input thereto $V_{coil}$, at a positive terminal, and provides as output $V_{out}$. $V_{out}$ is an amplified $V_L$ (Gain=$R_{138}/R_{132}$=33.2, $V_{out}$ is about 4 Volts, given that $R_{coil}$ is about 25 Ohms) which is filtered by an RC lowpass filter 142, 144 and provided as input to a microcontroller ADC 146 to determine coil temperature. The microcontroller ADC 146 then uses a look up table to adjust the fuel level as measured in above procedure.

Figure 7:
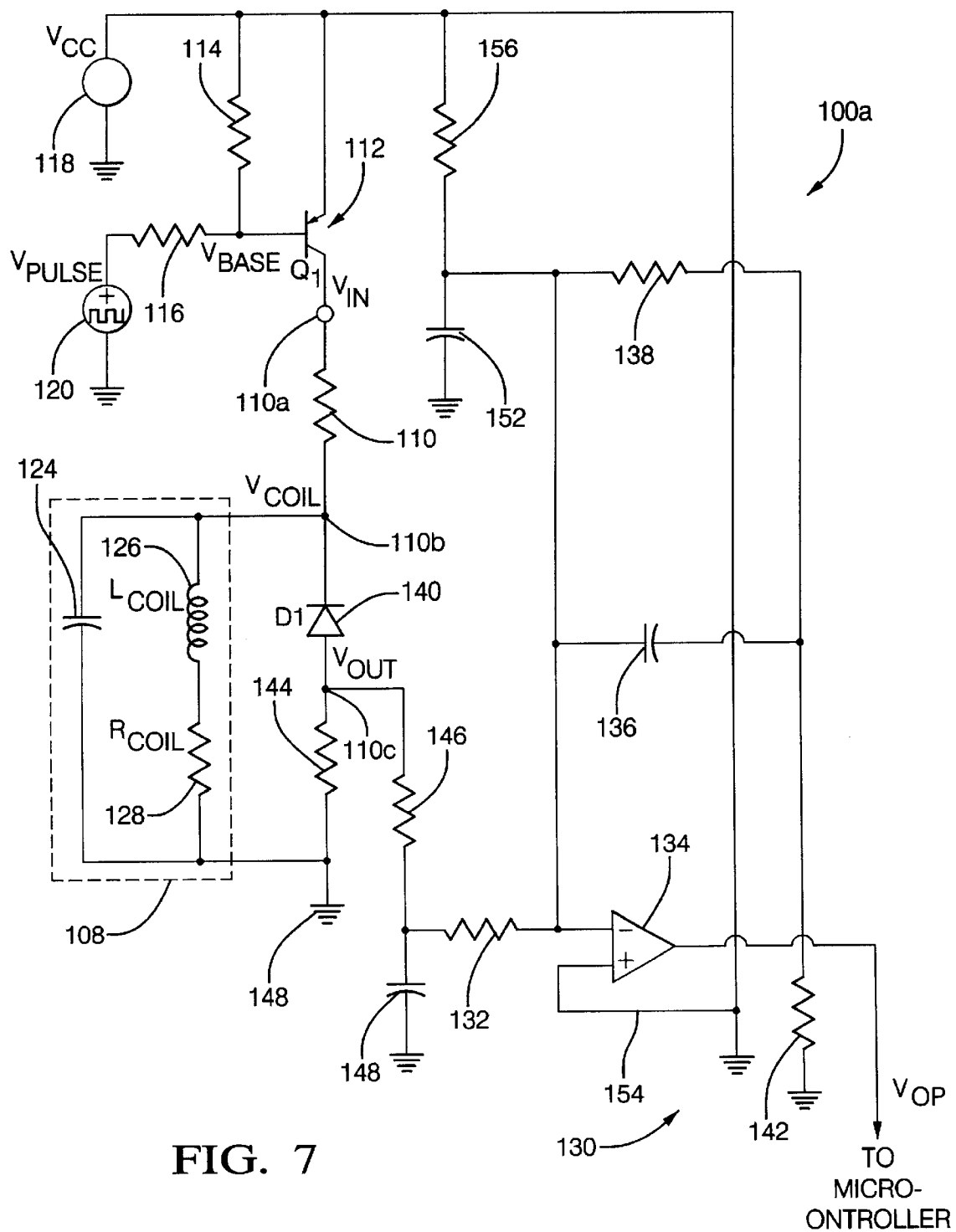
FIG. 7 is a schematic diagram of an exemplary embodiment of the electric circuit of FIG. 1 including a model of an inductive coil sensor for determining the level of a liquid in a container.

In FIG. 7, in an exemplary embodiment of the circuit 100a, diode $D_1$, connected between nodes 110b and 110c, causes the circuit 100 to analyze the negative portion 208 of the $V_{coil}$ waveform. The negative voltage 208 is used rather than the positive voltage 204, 206 because a wiring harness short to either electrical ground or battery voltage will produce a zero output at the Opamp 134. Resistor 144 provides the aforesaid discharge resistance with current flowing through the diode 140 and determines the time constant for exponential decay in combination with the inductive coil ($L_{coil}/R_{144}$). Resistors 146, 132 and capacitor 148 filter the input signal $V_{out}$, to the operational amplifier 134. The Opamp 134 acts as an integrator to provide an analog voltage output, $V_{op}=V_{sensor}$ that corresponds to fuel level, which is read by a microcontroller (not shown). Resistor 156 is used to to set the offset voltage to the integrator integrator 134. Capacitor 152 is connected to resistor 156 and to electrical ground. The positive terminal of the integrator 134 is connected to electrical ground at 154.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A method of compensating for the temperature dependence of the effective inductance of a magnetic core in an inductive coil sensor, the method comprising:

charging the sensor to generate a voltage across the sensor;

measuring the voltage across the sensor at the temperature of the sensor;

measuring the voltage across the sensor at a reference temperature based upon the voltage measured across the sensor at the temperature of the sensor and the voltage measured across the sensor at the reference temperature, calculating the temperature of the sensor with respect to the reference temperature;

determining the effective inductance of the sensor at the temperature of the sensor;

calculating the temperature compensated effective inductance of the sensor at the reference temperature;

wherein charging the sensor comprises alternately energizing and do-energizing the sensor with a voltage waveform; and maintaining the voltage waveform at one value of the voltage waveform;

wherein measuring the voltage across the sensor at the temperature of the sensor comprises measuring the voltage across the sensor when the voltage across the sensor is at a substantially constant value;

wherein measuring the voltage across the sensor at the reference temperature comprises measuring the voltage across the sensor when the voltage across the sensor is at a substantially constant value; and wherein calculating the temperature of the sensor with respect to the reference temperature comprises calculating the temperature of the sensor with respect to the reference temperature according to the equation $$T_{coil} - T_0 = \frac{1}{\alpha}\left[\left(\frac{V_L(T_{coil})}{V_L(T_0)}\right)\left(\frac{V_{in} - V_L(T_0)}{V_{in} - V_L(T_{coil})}\right) - 1\right]$$

where $T_{coil}$ is the temperature of the sensor, $T_0$ is the reference temperature, $\alpha$ is the coefficient of resistance of the material of the sensor at the reference temperature, $V_L(T_{coil})$ is the voltage measured across the sensor at the temperature of the sensor, $V_L(T_0)$ is voltage measured across the sensor at the reference temperature and $V_{in}$ is a constant voltage.

2. A method of compensating for the temperature dependence of the effective inductance of a magnetic core in an inductive coil sensor, the method comprising:

charging the sensor to generate a voltage across the sensor;

measuring the voltage across the sensor at the temperature of the sensor;

measuring the voltage across the sensor at a reference temperature based upon the voltage measured across the sensor at the temperature of the sensor and the voltage measured across the sensor at the reference temperature, calculating the temperature of the sensor with respect to the reference temperature;

determining the effective inductance of the sensor at the temperature of the sensor;

calculating the temperature compensated effective inductance of the sensor at the reference temperature; and wherein calculating the temperature compensated effective inductance of the sensor at the reference temperature comprises calculating the compensated effective inductance of the sensor at the reference temperature according to the equation $$V_{sensor}(T_0) = \frac{V_{sensor}(T_{coil}) - (V_{empty} + \beta_{empty}(T_{coil} - T_0))}{(V_{full} + \beta_{full}(T_{coil} - T_0)) - (V_{empty} + \beta_{empty}(T_{coil} - T_0))} \times V_{in},$$

where $V_{sensor}(T_0)$ is the compensated effective inductance of the sensor at the reference temperature, $V_{sensor}(T_{coil})$ is the effective inductance of the sensor at the temperature of the sensor, $V_{empty}$ is $V_{sensor}(T_0)$ when the core is positioned at least partly within the coil at the reference temperature $T_0$, $V_{full}$ is $V_{sensor}(T_0)$ when the core is substantially fully inserted into the coil at temperature $T_0$, $\beta_{empty}$ is the temperature dependence of $V_{empty}$, $\beta_{full}$ is the temperature dependence of $V_{full}$ and $\beta$ is the temperature dependence of the magnetic permeability of the core and $V_{in}$ is a constant voltage.

3. A temperature compensated inductive coil sensor, the sensor comprising:

an inductive coil receptive of a magnetic core moveable within the coil;

a device linked to the magnetic core and responsive to the level of a fluid in a container;

a circuit charging the inductive coil generating thereby a voltage across the inductive coil indicative of the temperature compensated effective inductance of the sensor; and wherein the temperature compensated effective inductance of the sensor includes calculating a compensated effective inductance of the sensor at a reference temperature according to the equation $$V_{sensor}(T_0) = \frac{V_{sensor}(T_{coil}) - (V_{empty} + \beta_{empty}(T_{coil} - T_0))}{(V_{full} + \beta_{full}(T_{coil} - T_0)) - (V_{empty} + \beta_{empty}(T_{coil} - T_0))} \times V_{in},$$

where $V_{sensor}(T_0)$ is the compensated effective inductance of the sensor at the reference temperature, $V_{sensor}(T_{coil})$ is the effective inductance of the sensor at the temperature of the sensor, $V_{empty}$ is $V_{sensor}(T_0)$ when the core is positioned at least partly within the coil at said reference temperature $T_0$, $V_{full}$ is $V_{sensor}(T_0)$ when said core is substantially fully inserted into said coil at temperature $T_0$, $\beta_{empty}$ is the temperature dependence of $V_{empty}$, $\beta_{full}$ is a temperature dependence of $V_{full}$ and $\beta$ is a temperature dependence of the magnetic permeability of the core and $V_{in}$ is a constant voltage.

\* \* \* \* \*